(Model.)

J. H. WEAVER.
DRIVE CHAIN.

No. 258,267.  Patented May 23, 1882.

Attest
Wilf C. Whiting
James W. Coyne

Inventor
James H. Weaver
By Coyne and Elliott
Atty's

N. PETERS, Photo-Lithographer, Washington, D. C.

UNITED STATES PATENT OFFICE.

JAMES H. WEAVER, OF CHICAGO, ILLINOIS, ASSIGNOR OF ONE-HALF TO MARTIN BEEM, OF SAME PLACE.

DRIVE-CHAIN.

SPECIFICATION forming part of Letters Patent No. 258,267, dated May 23, 1882.

Application filed February 12, 1881. (Model.)

*To all whom it may concern:*

Be it known that I, JAMES H. WEAVER, a citizen of the United States, residing in Chicago, county of Cook, and State of Illinois, have invented a certain new and useful Drive-Chain, of which the following is a specification.

My invention relates to improvements in "drive-chains" in which the links are cast in one piece and detachably connected together.

Heretofore detachable links have been made with a broad hook having an open throat into which the continuous end bar of the adjacent link is free to pass when the links are held at an angle to each other of forty-five degrees; but owing to the fact that such construction of end bar and hook does not admit of strengthening or bracing the point of the hook without interfering with their detachability against a strain tending to straighten the hook, the link becomes detached and the hook weakened and unfit for further use, which not only involves considerable expense, but loss of time.

The objects of my invention are, first, to obviate this objection by providing the throat of the hook with a diaphragm, brace, or bar at a point removed from the extreme outer sides of the hook, and connecting the point, or both the point and body of the hook, with the end bar contiguous to the shank of the hook, so as to strengthen and effectually prevent the hook from being straightened without interfering with its detachability of connection; second, to provide a hook with a diaphragm or strengthening-bar, connecting the point of the hook with the adjacent end bar, and adapted to form a locking device for the end bar of the adjacent link; third, to strengthen the end of the link opposite its hook to prevent a lateral spreading of the side bars and to admit of providing means for adapting the end bar to enter the hook of a corresponding link without substantially decreasing the required strength of such end bar; and, finally, to provide a detachable link with a hook at one end, having a strengthening-diaphragm connecting the point of the hook with the adjacent end bar, and at its opposite end with an end bar adapted to enter a corresponding hook of another link, and provided with means for preventing said hook and end bar from accidental detachment when connected together. I attain these objects by devices illustrated in the accompanying drawings, in which—

Figure 1:
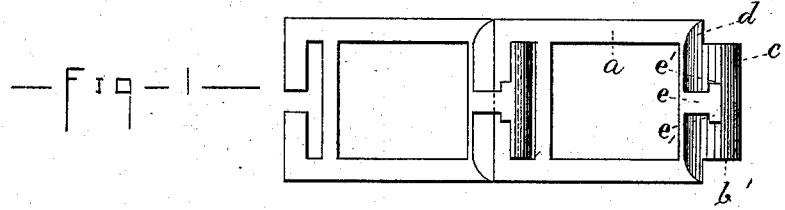
Figure 2:
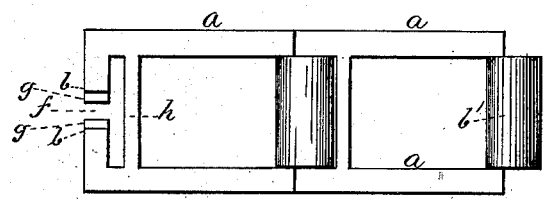
Figure 3:
Figure 4:
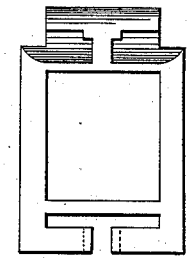

Figure 1 represents a plan view of two connected links embodying my invention; Fig. 2, a similar view of the reverse side of the same; Fig. 3, a side elevation of the same; and Fig. 4, a plan view of a single link, showing the conformation of the diaphragm of the hook.

Similar letters of reference indicate the same parts in the several figures of the drawings.

*a a* represent the side bars, and *b b'* the end bars proper, of the link. Upon and forming a part of the end bar, *b'*, is a broad hook, *c*, the point of which extends slightly above the plane or face of the link and is sufficiently removed from the end bar to form an open throat for admitting the insertion when held at an angle of forty-five degrees of the end bar, *b*, of an adjacent link.

In order to insure a close fit when passing the end bar of an adjacent link beyond the point of to its bearing in the hook the end bar, *b'*, is longitudinally grooved, as shown at *d*, to correspond with the configuration of that of the end bar so introduced.

At the center of width of the hook *c*, and cast therewith, is a diaphragm or brace, *e*, having on each side of its neck corresponding annular projections or steps, *e' e'*, which have a depth or thickness corresponding with that of the point of the hook. Diaphragm or brace *e* serves to form a rigid connection between the point of the hook and the adjacent end bar, and operates to stay and prevent the hook from being spread open by a longitudinal strain, while its steps afford means for locking the end bar of the adjacent link when in its operative position in the hook, as will be presently understood.

Instead of having a diaphragm extending to the shank or bottom of the hook, the end bar and point of the hook may be connected by a brace extending across the intervening space; but the construction first described is deemed preferable, for the reason that it forms a much stronger connection and has no tendency to interfere with the free pivotal movement of the links upon each other. So, also, the diaphragm or brace may be placed either on one side or the other of the center of width of the hook, the only restriction being that they shall not be placed so near the side of the hook that the bar of the adjacent link may not have a bearing on both sides of them against link. By having them centrally located, as before described, it will be understood that the strain upon both the end bar and the hook is much more evenly distributed along the entire length of the end bar and breadth of the hook.

End bar $b$ is provided with an opening, $f$, at its center of length corresponding in width to the neck or that portion of the diaphragm adjacent the end bar, $b'$, so that it may be passed beyond said neck into the hook when the links are held at the angle already referred to.

In order to insure a perfect but detachable locking of the links when connected, the inner ends of the end bar, $b$, are recessed at $g\ g$ to correspond with and enable it to pass the steps $e\ e$ when connecting the links, such recesses being formed on the under side of the end bar, so that when the links are in their operative position the recesses will face the shank of the hook and the projections or steps form a bearing against the upper face of the end bar.

To insure the side bars, $a\ a$, from spreading they are connected by a bar or rod, $h$, which is sufficiently removed from the end bar, $b$, to enable an unobstructed movement of the hook between it and the end bar, $b$, which it holds. The bar $h$ also serves to prevent the end bar, $b$, from springing, and consequently from impinging against the diaphragm, or causing the side bars from doing likewise against the edges of the hook.

It has been demonstrated in practice that the strain upon an end bar of a drive-chain is at or near its outer ends, and it will therefore be understood that separating an end bar at its center of length, as shown, does not materially weaken the same, as might at first be supposed, and I am therefore enabled to conform the diameter, &c., of the end bar of my link to that of the end bars ordinarily used, and which are continuous and not separated at their center, as are mine.

The configuration of my links is such that they may be cast in one piece, and will require little or no finishing to adapt them for immediate use.

Having thus described my invention, what I claim, and desire to secure by Letters Patent, is—

1. In a detachable chain, a link provided at one end with a hook having a bar or diaphragm connecting the point of the hook with the end bar, substantially as described, and at its opposite end with an open end bar.

2. In a detachable chain, a link provided at one end with a hook having a bar or diaphragm, substantially as described, and at its opposite end with an open end bar, in connection with a transverse bar intermediate the hook and end bar, and rigidly connecting the side bars of the links.

JAMES H. WEAVER.

Witnesses:
  J. A. FARWELL,
  W. R. BROWNE.